United States Patent

[11] 3,578,096

| [72] | Inventor | Chester T. Pearson<br>1102 S. W. Stephenson St., Portland, Oreg. 97219 |
|---|---|---|
| [21] | Appl. No. | 739,807 |
| [22] | Filed | June 25, 1968 |
| [45] | Patented | May 11, 1971 |

[54] AUTOMATIC THROTTLE CONTROL FOR AUXILIARY MOTORS DRIVING DRAWBAR-TOWED VEHICLES
7 Claims, 5 Drawing Figs.

[52] U.S. Cl. .................................................. 180/14, 192/3, 180/77
[51] Int. Cl. ................................................... B62d 59/04
[50] Field of Search ....................................... 180/14, 12, 77; 192/3

[56] References Cited
UNITED STATES PATENTS
1,804,257 5/1931 Greenley ..................... 180/14
2,432,417 12/1947 Heath ........................... 180/14
2,922,481 1/1960 Hutter et al. ................ 180/14

FOREIGN PATENTS
581,194 11/1924 France ........................ 180/14

*Primary Examiner*—Kenneth H. Betts
*Attorney*—Eugene D. Farley

ABSTRACT: An automatic throttle control for auxiliary motors driving drawbar-towed trailing vehicles comprises means mounting the drawbar resiliently for longitudinal movement, a throttle control motor and link means operatively linking the throttle control motor to the throttle. Actuating means for the throttle control motor are connected to the drawbar and adjust the throttle proportionately to longitudinal movement of the drawbar. Accordingly, as the vehicle is towed up a hill, movement of the drawbar adjusts the throttle setting to accelerate the auxiliary drive motor. As the vehicle descends the hill, the reverse drawbar movement and throttle adjustment occur.

PATENTED MAY 11 1971 3,578,096

Chester T. Pearson
INVENTOR
BY
Eugene D. Farley
Atty.

3,578,096

AUTOMATIC THROTTLE CONTROL FOR AUXILIARY MOTORS DRIVING DRAWBAR-TOWED VEHICLES

This invention pertains to automatic throttle controls for auxiliary motors which drive trailing vehicles being towed by other vehicles through the agency of drawbars.

The use in highway transport of heavy tractor-trailer units has become commonplace. A difficulty inherent in the operation of such units is caused by the extra load applied to the tractor in going up hills.

To overcome this difficulty "power dollies" have been employed. These comprise wheeled support units mounting auxiliary driving engines for the trailers.

On level ground the auxiliary engines do but little work. However, on inclines where additional power is needed, the auxiliary engines are accelerated sufficiently to meet the need. This adjustment is made manually and requires the constant attention of the operator.

Similarly, in the operation of trains over hilly terrain, it is common practice to include a pusher locomotive in the middle of the train. The pusher locomotive applies its power only on inclines where it is needed, and in carefully controlled amount since excessive application of drive would result in buckling of the train. This requires the presence of both an engineer and a maintenance man on the pusher locomotive.

It is the general purpose of the present invention to provide a throttle control for the auxiliary motors employed for driving towed vehicles which responds automatically to the load applied and accelerates or decelerates the auxiliary motor accordingly, thereby eliminating the need for extra attention by a truck operator, or the necessity of including an engineer on the pusher locomotive of a train.

It is a further object of the present invention to provide an automatic throttle control for auxiliary motors driving towed vehicles which includes override means for overriding the control in emergency situations.

Still a further object of the present invention is the provision of an automatic throttle control for towed vehicle auxiliary motors which control may be applied easily to a diversity of vehicle types without extensive modification of the towing mechanism.

Still a further object of this invention is the provision of an automatic throttle control for towed vehicle auxiliary motors which control is sensitive, easily adjustable, reliable and relatively maintenance free.

The manner in which the foregoing and other objects of this invention are accomplished will be apparent from the accompanying specification and claims considered together with the drawings wherein:

Generally stated, the automatic throttle control for auxiliary motors driving drawbar-towed trailing vehicles comprises means mounting the drawbar resiliently for longitudinal movement, a throttle control motor, and link means operatively linking the throttle control motor to the throttle. Actuating means for the throttle control motor are connected to the drawbar and adjust the throttle proportionately to longitudinal movement of the drawbar.

Accordingly, as the vehicle is towed up a hill, movement of the drawbar adjusts the throttle setting to accelerate the auxiliary drive motor. As the vehicle descends the hill, the reverse movement and adjustment occur.

Further included are override means for overriding the control as required in conditions of emergency when it is necessary to brake the vehicle under load-applying conditions.

Figure 1:
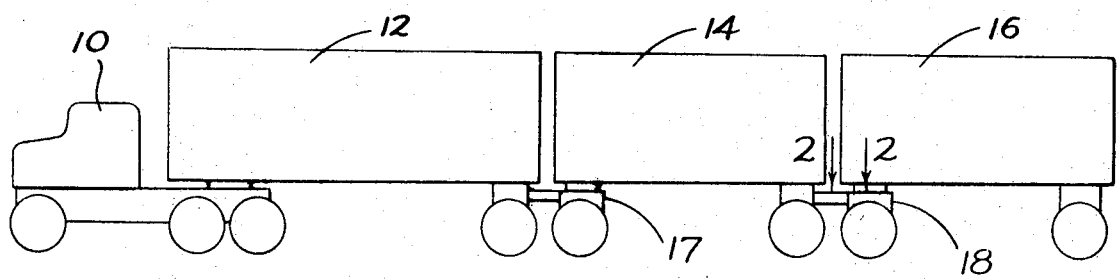
FIG. 1 is an outline view in side elevation of a tractor trailer assembly indicating the application of the hereindescribed auxiliary motor control.

Considering the foregoing in greater detail and with particular reference to the drawings:

A tractor-trailer assembly on which the hereindescribed automatic control may be applied to advantage is illustrated schematically in FIG. 1. The assembly includes a conventional tractor 10 which draws a first semitrailer 12, a second semitrailer 14, and even a third semitrailer 16. The trailers are coupled together in the usual manner through linkages including dollies 17 and 18 and associated drawbars. To provide the necessary auxiliary power on inclines, one of the dollies, dolly 18, comprises a "power dolly" mounting an auxiliary internal combustion engine in the usual manner.

The hereindescribed automatic throttle control is applied to this engine.

Figure 2:
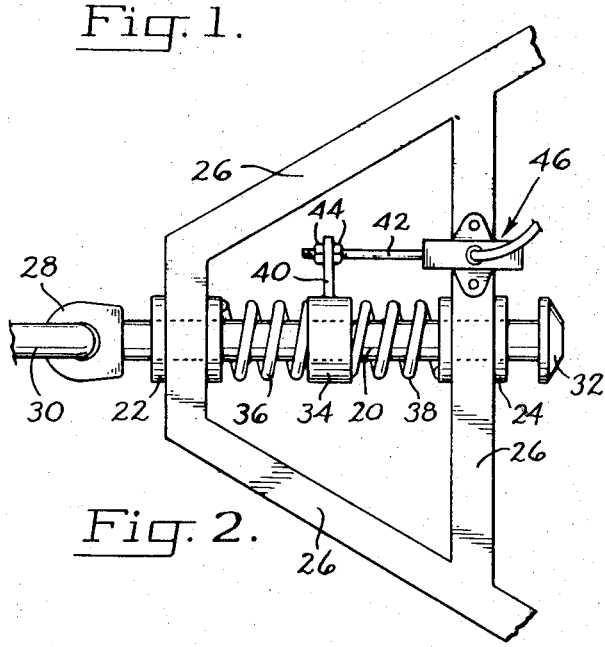
FIG. 2 is a fragmentary plan view looking in the direction of the arrows of line 2-2 of FIG. 1 and illustrating the construction of the control, positioned in the normal running position of the assembly on level ground.

As shown in FIG. 2, the application is made through the agency of a drawbar 20 mounted for sliding longitudinal movement in bearings 22, 24. The latter are secured to frame extension 26 of the dolly.

Drawbar 20 is provided at its forward end with an eye 28 by means of which it may be coupled pivotally to a link 30 on the rearward end of the trailer unit immediately ahead. The drawbar also is provided with a stop 32 at its rearward end, This is dimensioned for contacting the end of bearing 24 and preventing withdrawal of the drawbar therefrom.

The central portion of the drawbar is fitted with a fixed collar or boss 34. Together with bearings 22, 24, it serves as an abutment for stout compression springs 36, 38, fluid operated cylinders, or other suitable resilient means. These serve to center the drawbar and resist resiliently its displacement in either longitudinal direction.

In the event the tractor trailer assembly progresses up an incline, the increased load on drawbar 20 will cause it to slide forwardly in bearings 22, 24. This movement is used to actuate the hereindescribed automatic throttle control.

Fixed collar 34 supports a short post 40 having a transverse perforation at its outer end. The threaded forward end of a rod 42 is received in the perforation and maintained adjustably in position by means of adjustment nuts 44.

The trailing end of the rod slidably enters an electric switch 46 bolted or otherwise affixed to frame member 26.

Figure 3:
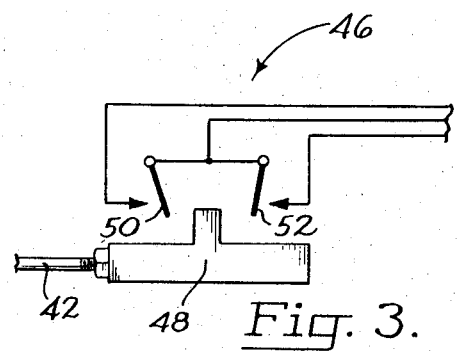
FIG. 3 is a schematic view illustrating the manner of operation of an actuator contained in the control, depicted in the same position as in FIG. 2.

The construction and manner of operation of switch 46 is illustrated in FIG. 3.

The rearward end of rod 42 is threaded into the body of a switch actuator 48 slidably mounted within the outer case of the switch.

Also mounted within the switch are a pair of spaced, spring-pressed switch closure elements 50, 52. In the normal rest position of the control, these are in the open position.

Switch elements 50, 52 are in an electric circuit with a battery powered reversible electric motor 54. Switch elements 50, 52 thus control the motor so that it alternates between a forward drive, a reverse drive, and an intermediate hold condition. The latter is its normal condition when switch 46 is in the position of FIG. 3.

Also included in the electric circuit are a normally closed switch 56 and a normally closed switch 58 which work to stop the motor at predetermined limits of operation.

Motor 54 drives a screw 60, preferably through a reduction gear. Screw 60 is threaded through a block 62. A pair of switch actuators 66, 68 are mounted on block 62 and extend outwardly in diametrically opposite directions. Actuator 66 works switch 56, while actuator 68 works switch 58.

Block 62 drives the linkage which controls the auxiliary engine throttle.

To this end there is provided a pin 70 extending outwardly from the side of the block. The pin pivotally receives one end of a link 72, thereby pivotally mounting the same.

The other end of link 72 is provided with a guideway 74 in which works a slide block 76 resiliently pressed by coil spring 78 housed within the guideway.

A lever 80 pivotally is connected to slide block 76 by means of a pivot pin 82 and associated bearing. The inner end of lever 80 is fixed to a rock shaft 84 by means of which throttle 86 is adjusted. Accordingly, when motor 54 is energized, it adjusts the throttle as required to govern the speed of the auxiliary engine of which the throttle is a part.

In the operation of a tractor-trailer assembly such as is illustrated in FIG. 1, the situation often arises in which it is necessary to override the action of the throttle control. Such a situation occurs, for example, when the tractor-trailer assembly is progressing up an incline with the auxiliary motor working. If it becomes necessary to apply the brakes in an emergency, or in the normal operation of the assembly, it is desirable to adjust the throttle so that the auxiliary motor discontinues its drive even though the assembly still is progressing up the incline.

Figure 4:
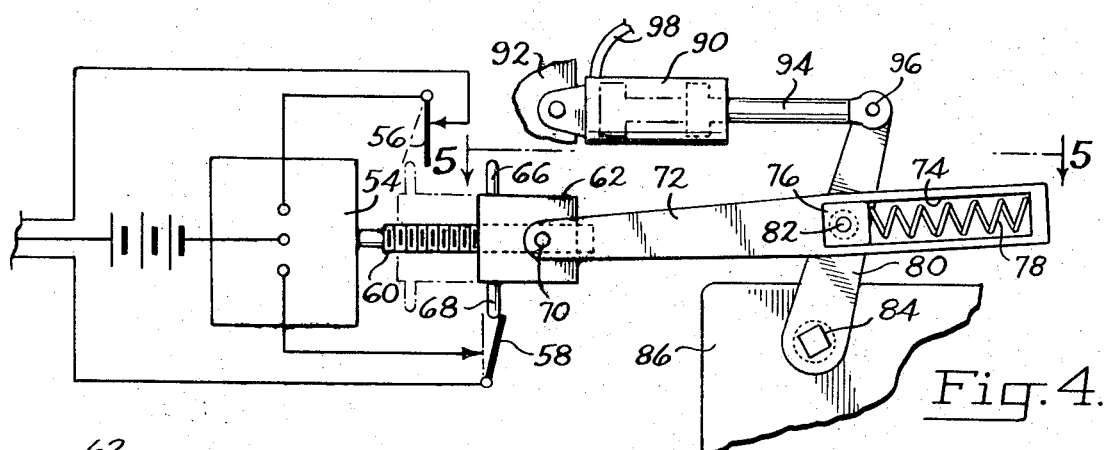
FIG. 4 is a fragmentary view further illustrating the structure and mode of operation of the control as applied to the throttle of an auxiliary drive motor for a vehicle, positioned in the idling position of the unit.
Figure 5:
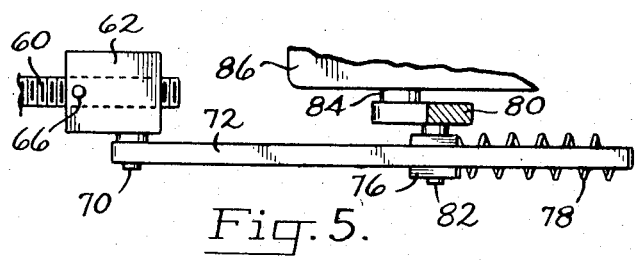
FIG. 5 is a fragmentary plan view looking in the direction of the arrows of line 5-5 of FIG. 4.

This action is obtained through the override linkage illustrated in FIGS. 4 and 5.

A pneumatic cylinder 90 is mounted with its case pivoted to a frame member 92. Its piston rod 94 is coupled by means of a pivot pin 96 to the outer end of lever 80. The cylinder is connected through hose 98 to the air line which actuates the brakes of the vehicle. Consequently, whenever the brakes are applied, the piston of cylinder 90 is driven to its extended position. This moves lever 80 against the force of spring 78 and returns the throttle to the idling position of the motor.

OPERATION

The operation of the hereindescribed automatic throttle control is as follows:

The normal running condition of the control is illustrated in FIGS. 2 and 3 and in FIG. 4, when switches 56, 58 both are closed. This condition exists when the tractor-trailer assembly is traveling over level ground. It applies a predetermined auxiliary driving force to the assembly.

However, when the assembly traverses an incline, the increased load causes drawbar 20 to be extended, compressing spring 36 and extending spring 38. This extends plunger 42 and closes normally open switch 50, FIG. 3.

Reversible motor 54 now is energized through a circuit including normally closed switch 56. The motor drives screw 60. This in turn draws block 62 toward the motor and through link 72, moves lever 80 counterclockwise as shown in FIG. 4.

Movement of lever 80 accomplishes two functions. First, it adjusts throttle 86 to accelerate the auxiliary engine of which the throttle is a component, thereby applying the added power necessary to push the tractor-trailer assembly up the incline. Second, it moves the piston of the air cylinder 90 to its retracted position.

Block 62 continues its movement until the dolly engine compensates for the additional load and opens switch 50, or until actuator 66 moves normally closed switch 56 to its open position, normally closed switch 58 remaining in its closed position. This breaks the circuit and halts the drive of screw 60.

When the assembly reaches the top of the incline and levels out, plunger 42 moves in the opposite direction, so that the system returns to neutral, with actuator 48 in its intermediate position between normally open switches 50, 52 and actuators 66 and 68 in their intermediate positions between normally closed switches 56 and 58.

In the event that the tractor-trailer assembly progresses down a hill, the reverse action occurs. Plunger 42 moves in a reverse direction and closes normally open switch 52. This causes motor 54 to operate in the reverse direction, adjusting block 62 to the idling full line position illustrated in FIG. 4, in which switch 56 is closed, and switch 58 is open.

If a situation occurs during an uphill climb in which it is necessary for the operator to apply his brakes, the brake air is supplied to cylinder 90 through hose 98. It drives the piston rod of the cylinder to its advanced position. This in turn returns throttle 86 to its idle position, against the force of spring 78. The auxiliary drive thus is discontinued.

In this manner there constantly is applied to the throttle of the auxiliary engine a control which causes the engine to accelerate or decelerate to whatever extent is necessary to apply the required drive to the assembly.

It is to be understood that the form of my invention herein shown and described is to be taken as an illustrative example of the same and that various changes in the shape, size and arrangement of parts may be resorted to without departing from the spirit of my invention or the scope of the subjoined claims.

I claim:

1. For use in controlling a throttle-regulated auxiliary drive motor applied to driving a trailer towed by a towing vehicle, the throttle control comprising:
   a. a drawbar,
   b. means coupling the forward end of the drawbar to the towing vehicle and the rearward end thereof to the trailer,
   c. drawbar mounting means mounting the drawbar for a longitudinal movement determined by the trailer load,
   d. resilient means locating the drawbar in a normal running position of the auxiliary motor,
   e. a throttle control motor,
   f. link means operatively linking the throttle control motor to the throttle, and
   g. actuating means for the throttle control motor connected to the drawbar and responsive to longitudinal movement thereof, thereby adjusting the throttle proportionately to such movement.

2. For use in controlling a throttle-regulated auxiliary drive motor applied to driving a trailer towed by a towing vehicle, the throttle control comprising:
   a. a drawbar,
   b. means coupling the forward end of the drawbar to the towing vehicle and the rearward end thereof to the trailer,
   c. drawbar mounting means mounting the drawbar for a longitudinal movement determined by the trailer load and comprising a pair of spaced bearings receiving the drawbar and fixed to the frame of the vehicle or trailer, and stop means on the drawbar for limiting its longitudinal movement,
   d. resilient means locating the drawbar in a normal running position of the auxiliary motor,
   e. a throttle control motor,
   f. link means operatively linking the throttle control motor to the throttle and
   g. actuating means for the throttle control motor connected to the drawbar and responsive to longitudinal movement thereof, thereby adjusting the throttle proportionately to such movement.

3. The throttle control of claim 2 wherein the drawbar is provided with a boss and compression springs mounted on the drawbar, one on each side of the boss for resiliently centering the drawbar.

4. For use in controlling a throttle-regulated auxiliary drive motor applied to driving a trailer towed by a towing vehicle, the throttle control comprising:
   a. a drawbar,
   b. means coupling the forward end of the drawbar to the towing vehicle and the rearward end thereof to the trailer;
   c. drawbar mounting means mounting the drawbar for a longitudinal movement determined by the trailer load,
   d. resilient means locating the drawbar in a normal running position of the auxiliary motor,
   e. an electric throttle control motor,
   f. motor energizing means mounted on the drawbar in an electric circuit with the motor for energizing the same,
   g. a screw driven by the motor,
   h. a drive block driven by the screw, and
   i. link means connecting the drive block to the throttle of the auxiliary motor.

5. The throttle control of claim 4 wherein the motor energizing means comprises switch means in the electric circuit and switch actuator means mounted on the drawbar and operative to actuate the switch upon movement of the drawbar.

6. For use in controlling a throttle-regulated auxiliary drive motor applied to driving a trailer towed by a towing vehicle, the throttle control comprising:
  a. a drawbar,
  b. means coupling the forward end of the drawbar to the towing vehicle and the rearward end thereof to the trailer,
  c. drawbar mounting means mounting the drawbar for a longitudinal movement determined by the trailer load,
  d. resilient means locating the drawbar in a normal running position of the auxiliary motor,
  e. a throttle control motor,
  f. link means operatively linking the throttle control motor to the throttle,
  g. actuating means for the throttle control motor connected to the drawbar and responsive to longitudinal movement thereof, thereby adjusting the throttle proportionately to such movement, and
  h. brake-operated throttle control override means connected to the throttle and operative to return it to its idle running position upon operation of the vehicle brakes.

7. The throttle control of claim 6 wherein the brakes are pneumatic brakes and the brake-operated override means comprise a pneumatic cylinder in the pneumatic circuit operating the brakes, and spring pressed link means linking the cylinder to the throttle for return of the throttle to its idle operating position upon applying air to the brakes and the cylinder.